United States Patent [19]
Scott

[11] Patent Number: 5,948,254
[45] Date of Patent: Sep. 7, 1999

[54] CLEANING SYSTEM AND METHOD FOR CLEANING AND PURIFYING REVERSE OSMOSIS SYSTEMS

[75] Inventor: Michael Joseph Scott, Louisville, Ky.

[73] Assignee: Flux Enhancement Systems, Inc., Louisville, Ky.

[21] Appl. No.: 08/789,792

[22] Filed: Jan. 29, 1997

[51] Int. Cl.⁶ .................................................. B01D 63/00
[52] U.S. Cl. ............................. 210/321.69; 210/195.2; 210/257.2; 210/85; 210/86; 210/134; 210/136; 210/636
[58] Field of Search ........................... 210/650, 651, 210/652, 195.2, 257.2, 86, 85, 134, 136, 321.69, 636

[56] References Cited

U.S. PATENT DOCUMENTS

| | | | |
|---|---|---|---|
| 4,451,132 | 5/1984 | Kishimoto et al. | 210/195.2 |
| 4,885,095 | 12/1989 | Rich | 210/321.69 |
| 5,207,917 | 5/1993 | Weaver | 210/651 |
| 5,352,363 | 10/1994 | Shibano | 210/651 |
| 5,520,816 | 5/1996 | Kuepper | 210/195.2 |
| 5,542,983 | 8/1996 | Hamilton et al. | 210/651 |
| 5,607,592 | 3/1997 | Bernard et al. | 210/652 |
| 5,755,957 | 5/1998 | Jeon | 210/86 |

*Primary Examiner*—Ana Fortuna
*Attorney, Agent, or Firm*—Wheat, Camoriano, Smith & Beres, PLC

[57] ABSTRACT

A water purification system and a cleaning system and method for periodically flushing reverse osmosis water purification systems to rid the system of decontamination and other pollutants that build up during use. The system include a pair of containers in liquid communication, a first plurality of liquid conduits defining a looped path for passing liquid from the first container to a membrane and back to the first container, while a second plurality of liquid conduits defines a path for the liquid in the second container to the product side of the membrane.

15 Claims, 5 Drawing Sheets

CLEAN RO PRODUCT H₂O

HIGH OSMOTIC VALVE SOLUTION

LOW OSMOTIC VALVE SOLUTION

EQUALIZED OSMOTIC SOLUTION

| COMPONENT | FILLING CONTAINER | CLEANING R/O SYSTEM |
|---|---|---|
| PUMP 38 | OPERATING-TURNS OFF IF BOTH SWITCH. 70a AND 70b CLOSED | |
| VALVE 32 | CLOSED | CLOSED |
| VALVE 36 | OPEN | CLOSED |
| VALVE 38 | CLOSED | OPEN |
| VALVE 62 | CLOSED | OPEN |
| VALVE 63 | OPEN-CLOSES IF SWIT. 70a IS CLOSED | CLOSED |
| VALVE 64 | OPEN-CLOSES IF SWIT. 70b IS CLOSED | OPENS WHEN PUMP 60 ACTIVATED |
| VALVE 65 | CLOSED | OPEN |
| VALVE 66 | OPEN | CLOSED |
| VALVE 68 | OPEN | CLOSED |
| pH MONITOR 72 | OFF | ON |
| LOW LEVEL SWITCH 74 | INACTIVE | ACTIVE |
| HIGH LEVEL SWITCH 70a | ACTIVE | INACTIVE |
| HIGH LEVEL SWITCH 70b | ACTIVE | INACTIVE |
| PUMP 60 | OFF | ON |
| VALVE 80 | CLOSED | CLOSED |
| VALVE 81 | CLOSED | CLOSED |

FIG. 7

CLEANING SYSTEM AND METHOD FOR CLEANING AND PURIFYING REVERSE OSMOSIS SYSTEMS

BACKGROUND OF THE INVENTION

This invention relates to water purification systems, and in particular, to a cleaning system and method for periodically flushing reverse osmosis water purification systems to rid the systems of decontaminants and other pollutants that build up during use.

Osmosis is a process that occurs when two similar solutions come into contact across a semi-permeable membrane acting as a barrier to the solute molecules, but permitting the solvent molecules to pass across. When one of the solutions has a higher concentration of solute than the other, the solvent will pass from the weaker concentration solution ("less osmotic active") solution to the higher concentration solution ("higher osmotic active") until the concentration of solute to solvent is the same on both sides. Reverse osmosis reverses this process by applying pressure to the higher osmotic active solution, forcing the solvent to go through the membrane to the less active solution thus resulting in a continuously more pure solvent, i.e., the "clean R/O product". Reverse osmosis systems ("R/O systems") have wide spread application ranging from use in desalination of salt water systems to kidney dialysis apparatus.

During the reverse osmosis process, the membranes and other operation components of the R/O system, including the component containing the semi-permeable membrane (the "R/O unit"), slowly become contaminated and it is necessary to periodically clean the system including the membrane. Numerous cleaning techniques have been employed as disclosed by U.S. Pat. Nos. 3,835,756, 4,7565, 906, and 5,393,502. The state of the art is perhaps best described by reference to U.S. Pat. No. 4,784,771 issued Nov. 15, 1988 to Ronald L. Wathen et. al. and assigned then to Environmental Water Technologies. While effective, the system of this patent is representative of the complex nature of systems presently used to clean R/O systems of contaminants.

An important object of the present invention is to provide a simple but effective system for the cleaning of R/O systems.

It is still another important object of the present invention to provide for a cleaning system that can be readily attached or incorporated into a R/O system, resulting in the cleaning of contaminant from the system in a self-controlling manner which minimizes oversee of the cleaning cycle.

Other important advantages will become readily apparent following a reading of the following in reference to the FIGS.

SUMMARY OF THE PRESENT INVENTION

The cleaning system of the present invention comprises a pair of containers that are in liquid communication so that when the liquid capacity of one of the containers is exceeded, liquid flows into the other container. A first plurality of liquid conduits defines a looped path for the liquid in the first container to the feed side of a R/O unit and back to the first container while a second plurality of liquid conduits defines a path for the liquid in the second container to the product side of the R/O unit. When the containers are filled with a clean R/O liquid product, e.g., water, essentially to the capacity of each (called the "filling cycle"), a cleaning solution is added to the liquid in the first container, creating a liquid having a high osmotic value. The high osmotic value liquid in the first container is circulated in the looped path while the low osmotic value liquid in the second container is moved to the product side of the R/O unit (called the "cleaning cycle"). The osmotic pressure differential causes liquid to move from the product side across the unit membrane to the feed side, joining the liquid in the looped path and causing the liquid in the first container to exceed the capacity of the first container. An overflow condition then exists and liquid flows into the second container. Eventually, the osmotic values existing in the two containers equilibrate and flow across the membrane ceases. The flow in the looped path continues for a predetermined time period following equilibration and then is discontinued, ending the cleaning cycle. Both containers then may be drained and flushed with clean liquid, thus preparing the cleaning system for another filling and cleaning cycle.

BRIEF DESCRIPTION OF THE DRAWING

FIG. 7 is a chart showing the various component settings for the filling and cleaning sequences of the cleaning and R/O systems.

DETAILED DESCRIPTION OF THE PREFERRED EMBODIMENT

The invention as described is suitable for use with any R/O system. For example, the present invention may be used with the R/O system described in detail in U.S. Pat. No. 4,784,771. However, for the sake of clarity and simplicity, such systems are only described to the extent needed to show how the present invention may be tied into the systems.

Figure 1:
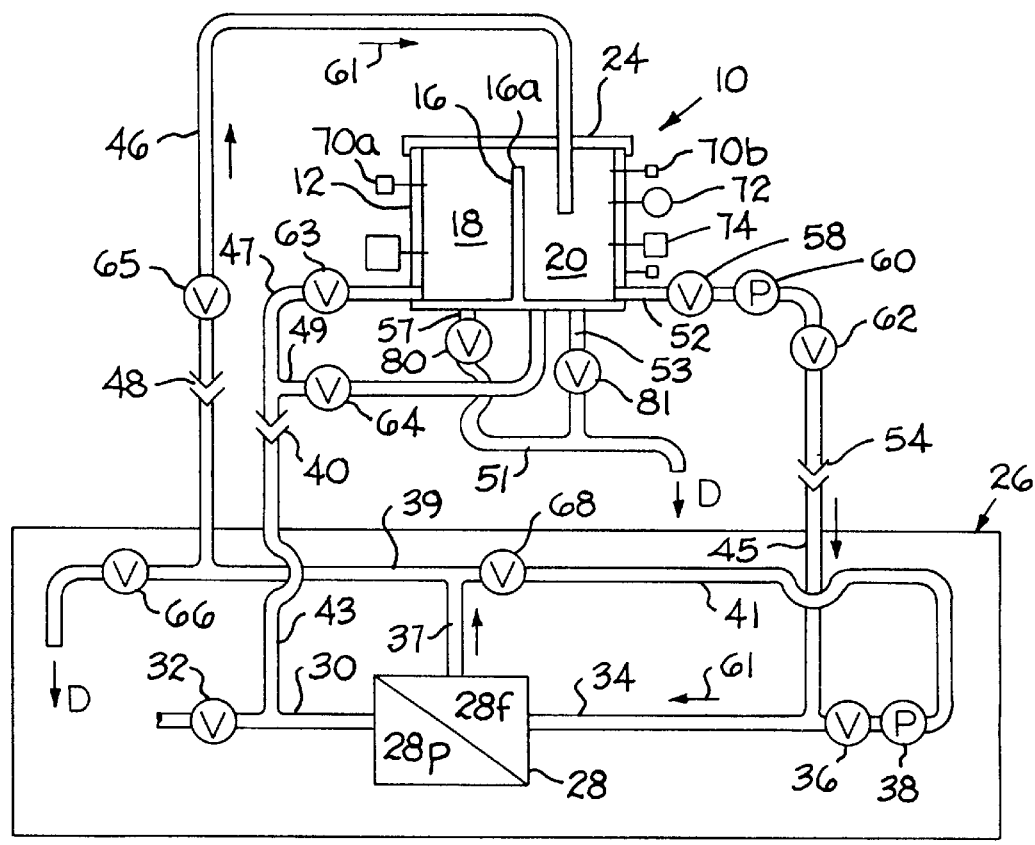
FIG. 1 is a schematic of a cleaning system in accordance with the present invention attached to a typical R/O system.

In FIG. 1, a container shown generally by the character numeral 10 has side walls 12 and a bottom wall 14 defining a predetermined volume with an interior dividing wall 16 essentially bifurcating the predetermined volume into two lesser compartments 18 and 20. Wall 16 extends upward from a container bottom wall 14 but terminates short of the removable container top 24. The gap between the dividing wall edge 16a and top 24 permits interior communication between the compartments 18 and 20.

Container 10 is connected by various fluid conduit lines at various points to the R/O system illustrated diagrammatically as block 26. While there may be numerous components within the R/O system 26, only those believed essential or necessary for an understanding of the present invention are set forth. Central to the system 26 is a R/O membrane vessel 28 that has a feed side 28f and a product side 28p separated by an R/O membrane 29. A fluid conduit line 30 connects a valve 32 to the product side 28p while a fluid conduit line 34 connects valve 36 and R/O system circulating pump 38 to feed side 28f. Another fluid conduit line 37 splits into fluid conduit lines 39 and 41 with line 39 leading through valve 66 to drain D while line 41 leads through valve 68 back to line 34 outside of pump 38. Conduit line 43 connected to line 30 between valve 32 and product side 28p leads to a quick snap fitting 40 located to the exterior of system 26. Similarly, conduit line 45 connected to line 34 between valve 36 leads to a quick snap fitting 54 located to the exterior of system 26.

Fluid conduit line 42 connects to the other side of fitting 40 and splits into conduit lines 47 and 49, respectively, leading through valves 63 and 64 to the bottom of compartments 18 and 20. Compartment 18 is additionally connected by conduit line 51 through valve 80 to the drain D. Similarly, compartment 20 is connected by conduit line 53 through valve 81 merging into conduit line 51 to the drain D. Conduit line 46 is further connects compartment 20 through isolating valve 65 and quick snap fitting connector 48 to the R/O system 26 and conduit line 39. Finally, conduit line 52 from compartment 20 leads through valve 58, circulating pump 60, and valve 62 and, through snap fitting 54, is connected to conduit line 45 within R/O system 26 that merges into conduit line 34 leading to the feed side 28f.

Figure 1A:
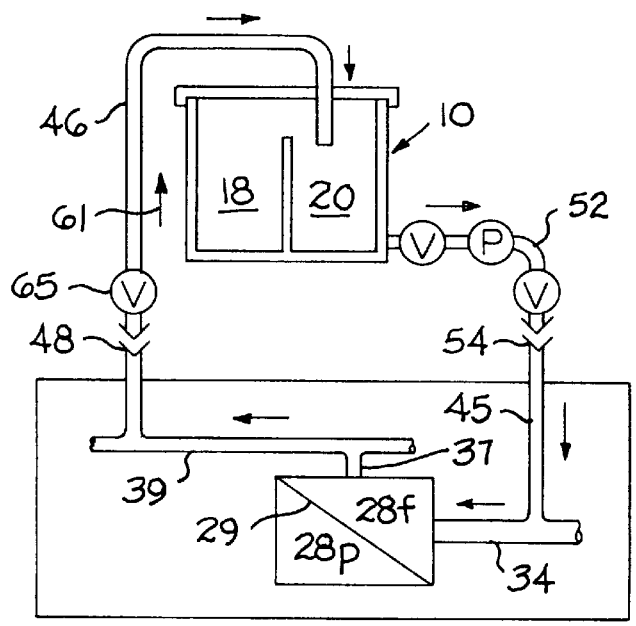
FIG. 1a is a schematic of the cleaning system in accordance with the present invention limited to showing the flow loop of the cleaning liquid during the cleaning cycle.
Figure 1B:
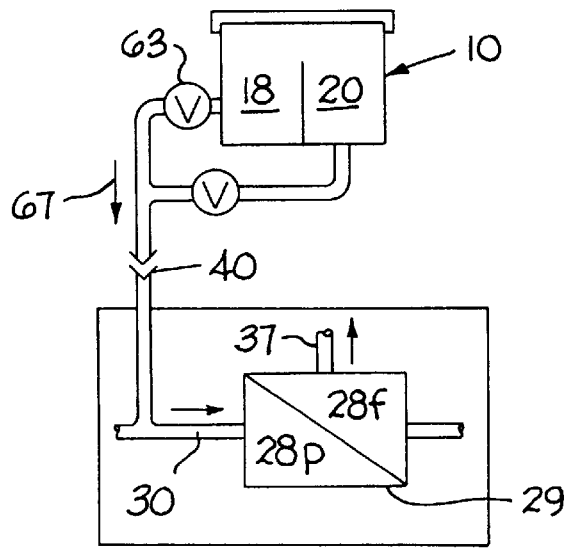
FIG. 1b is a schematic of the cleaning system in accordance with the present invention limited to showing the flow of the clean R/O product under osmotic pressure during the cleaning cycle.

As perhaps best seen in FIG. 1a, various conduit lines comprising conduit lines 52, 45, 34, 39, and 46 collectively form a primary loop circuit, shown by the heavy arrows 61, leading from compartment 20 to the feed side 28f and back to compartment 20. A secondary circuit, best seen in FIG. 1b, shown by the lighter arrows 67 is formed by conduits 30, 43, and 42, and 47 that leads from compartment 18 to the product side 28p across membrane 29 and into the primary circuit at conduit line 37.

Figure 3:
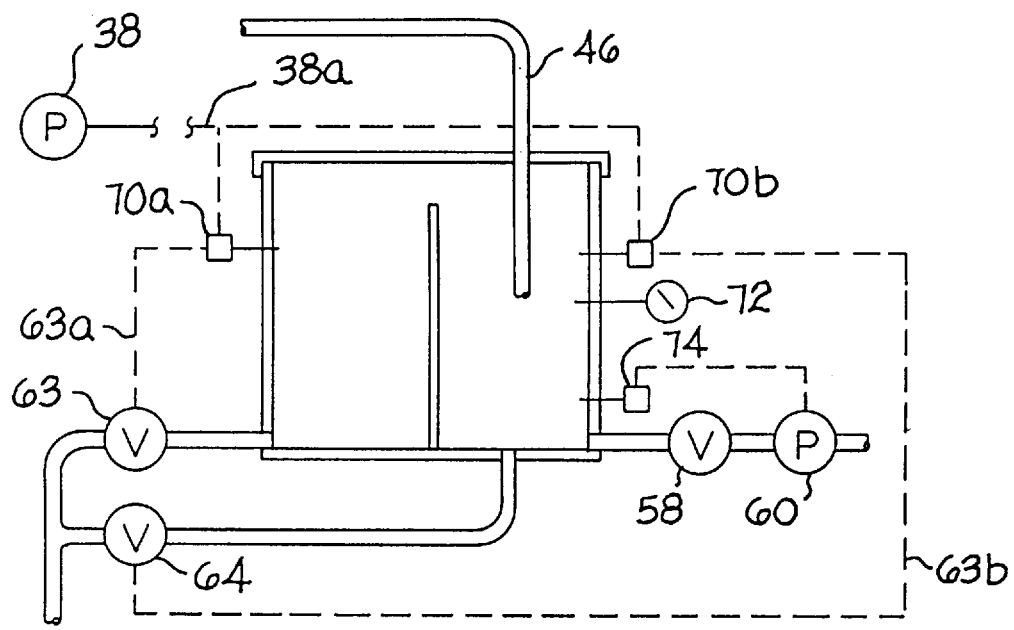
FIG. 3 is a schematic of the present invention prior to the introduction of liquids into the bifurcated container.
Figure 4:
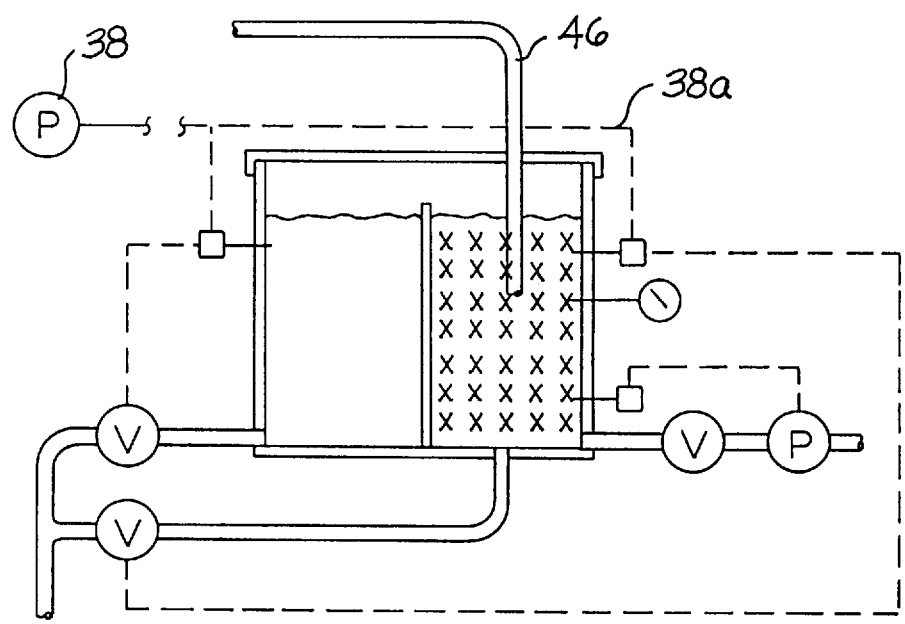
FIG. 4 is a schematic like FIG. 3 except a cleaning solution of high osmotic value is present in one compartment and a solution of low osmotic value is present in the second compartment.

Compartments 18 and 20 of container 10 may be provided with respective high fluid level switches 70a and 70b that are electrically tied to valves 63 and 64 (shown by dashed lines 63a and 63b in FIGS. 3 and 4) and to pump 38 within the R/O system 26 (shown by dashed line 38a in FIGS. 3 and 4). As discussed below, switches 70a and 70b monitor when the fluid in the respective compartments reaches a predetermined level. Additionally, compartment 20 may be provided with a pH monitor controller 72 that determines first if the pH of the liquid cleaner supplied to the compartment 20 is within acceptable limits of tolerance of the membrane 29 of the R/O unit 28 (as determined by the membrane manufacturer). Compartment 20 is preferably provided with a low fluid level switch 74 that automatically turns off pump 60 when the level of liquid goes below a predetermined level.

Figure 2:
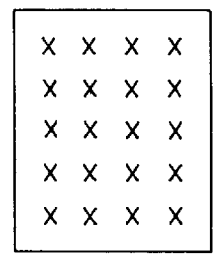
FIG. 2 is a symbolic representation of the osmotic state of various liquids.
Figure 2:
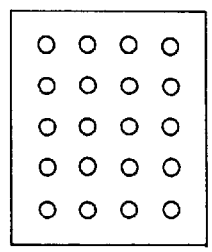
Figure 2:
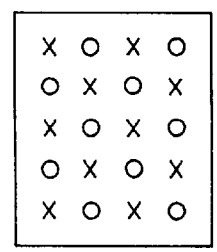

To best describe the operation of the present invention, reference is now made to FIGS. 2–6 and the operating sequences of FIG. 7. FIG. 2 provides the symbolic representation of fluids in various osmotically active states. The box (a) having a clear liquid represents a fluid having a little osmotic value such as might be found in pure water, a product of reverse osmosis procedure, while the box (b) illustrates a liquid having a high osmotic value. Box (c) illustrates a liquid of low osmotic value while box (d) illustrates an equalized osmotic value solution.

At the start of the filling cycle, both compartments 18 and 20 are empty of the clean R/O product as shown in FIG. 3. To fill the compartments 18 and 20 to capacity with clean R/O product, the various valves and other operating components are set as shown in the "FILLING CONTAINER" column of FIG. 7. Valve 32 is open and clean R/O product flows from the R/O system 26 into compartments 18 and 20 though open valves 63 and 64. To ensure that the volume of liquid feed into the compartments 18 and 20 does not exceed the individual capacities thereof during the filling cycle, high level monitoring switches 70a and 70b, located at almost the height of the dividing wall 16, are tied to valves 63 and 64 and to pump 38 in the R/O system 26. When one or the other of switches 70a or 70b is triggered or closed, the associated valve 63 or 64 is opened to prevent overflow. Should both switches be closed, pump 38 is de-energized or turned off. Once the compartments 18 and 20 are filled, pump 38 is turned off and valves 63 and 64 are closed. A cleaning chemical such as, for example, hydrochloric acid or sodium chloride, is placed into compartment 20 and the system is ready for the cleaning cycle as illustrated in FIG. 4.

Figure 5:
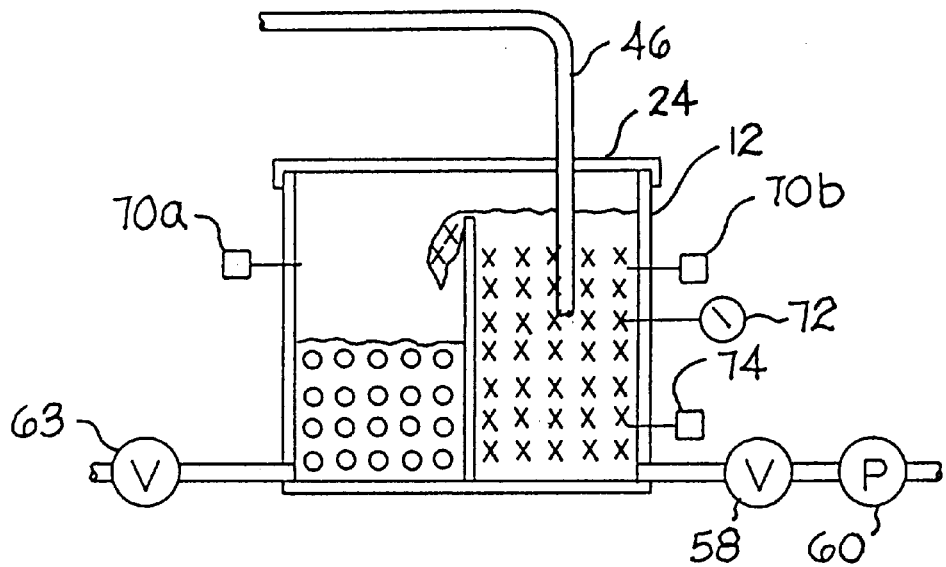
FIG. 5 is a schematic like FIG. 4 except the volume of the high osmotic value liquid has been increased in the one compartment to a level where it flows over a dividing barrier into the second compartment.
Figure 6:
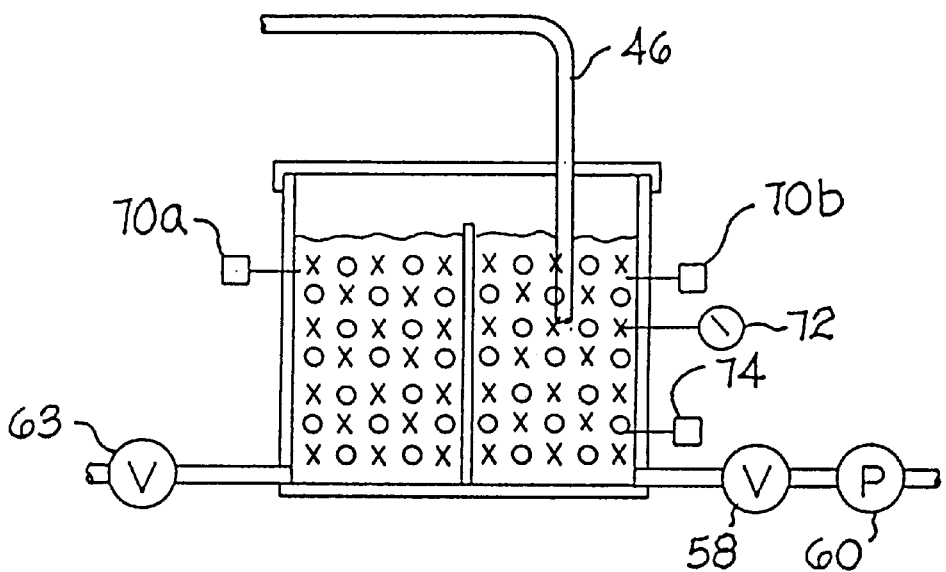
FIG. 6 is a schematic like FIG. 5 except the liquids in the two compartments have reached a state of equilibrium in which the liquids have essentially the same osmotic value.

To initiate the cleaning cycle, the various components are set as illustrated in the column labeled "CLEANING R/O SYSTEM" of FIG. 7. Valves 58, 62 and 65 are open while valves 36, 66 and 68 are closed. Pump 60 then may be energized, opening valve 63, and the cleaning liquid moves along the aforementioned loop circuit 61 (as shown in FIG. 1a) from compartment 20 to feed side 28f and back to compartment 20. Since valve 63 has automatically opened, the liquid in compartment 18 flows to the product side 28p, as shown in FIG. 1b, due to the osmotic pressure developed within the R/O unit 28 and, in some R/O system designs, a pressure head between the compartment 18 and R/O unit 28. The solvent of the low osmotic value liquid coming from compartment 18 then begins to flow across membrane 29 of the R/O unit 28 osmotically to the feed side 28f and mixes with the liquid flowing in loop 61. This osmotic flow increases the volume of liquid in compartment 20. When this volume exceeds the capacity of compartment 20, the liquid flows over the top edge 16a of dividing wall 16 into compartment 18 as depicted in FIG. 5. This flow will continue as long as there is as osmotic differential across membrane 29 from the product side 28p into the feed side 28f. At some point in the cleaning cycle, however, the liquids in compartments 18 and 20 will equilibrate and have the same osmotic value as illustrated in FIG. 6. No further flow will occur across membrane 29. However, for a predetermined time period after the flow ceases across membrane 29, the cleaning solution will continue be recirculated by pump 60. At that point, the R/O system is considered clean and pump 60 de-energizes and the open valves are closed. Thereafter, the liquid in each compartment 18 and 20 can then be drained by manually opening valves 80 and 81, leading to the drain D.

Most of the components used to fabricate the cleaning system of the present invention are standard items, readily available from a multiplicity of manufacturers. All of the valves used in the cleaning system are the ball valve type, either automatic or manual where appropriate, and available from various manufacturers such as Asahi Company or Chemtrol corporation. The switches 70a and 70b are magnetic float type switches available from Compac or GEM. The pH monitor 72, measuring the pH level of the cleaning solution, can be readily acquired from Foxboro or Thornton. Pump 60 is a single stage, stainless steel, centrifugal pump obtainable from Gould or Ingersol Rand.

From the above it can be seen that the system and method in accordance with the present invention addresses the objects of the invention and provides for a simple but effective technique of cleaning a typical R/O system. The system can be connected, i.e., "retrofitted", to a typical R/O system through the use of quick connecting fittings as illustrated above or incorporated as part of the overall R/O system through direct conduit connections. By utilizing the bifurcated container 10 in conjunction with the continuous recycling of the cleaning solution liquid from compartment 20 and the addition of clean liquid from compartment 18, an automatic sequence and essentially self-operating cleaning cycle can be established with little need for operator control and oversee. While only a preferred embodiment of the invention was disclosed, it is understood that changes and modifications will become clear to those with ordinary skill in the art and that such changes should be interpreted within the intended spirit and scope of the inventive concept as claimed herein.

I claim:

1. A cleaning system for removing contaminants from an apparatus having a semipermeable membrane, comprising:

a pair of containers in liquid communication with one another so that, when a liquid capacity of said first container is exceeded, liquid flows from said first container to said second container;

a first plurality of liquid conduits connected to said first container and adapted to place said first container in a conduit loop with a first side of said membrane;

a cleaning cycle pump positioned in said conduit loop for effectively moving liquid in said first container to said first side of said membrane and back to said first container; and a second plurality of liquid conduits placing said second container in liquid communication with a second side of said membrane whereby liquid from said second container migrates osmotically across said membrane when the liquid in said second container has a lower osmotic value than the liquid in said first container and continually increases the volume of liquid in said first container until the liquid overflows into said second container.

2. The cleaning system of claim 1 in which said first and second containers are respective first and second compartments of a bifurcated, substantially enclosed cleaning container having an interior liquid barrier wall separating said first and second compartments, said first and second compartments being in fluid communication over a top of said barrier wall.

3. The cleaning system of claim 2 including a valve associated with said second plurality of conduits for opening and closing said second plurality of conduits, said valve operatively associated with said pump for opening said second plurality of conduits when said pump is energized.

4. The cleaning system of claim 2 including a third plurality of conduits connecting said first and second compartments to a source of clean liquid and a filling pump for filling said first and second compartments with clean liquid.

5. The cleaning system of claim 4 including a pair of filling valves associated with said third plurality of conduits, a pair of high liquid level detectors each associated with one of said first and second compartments and operatively connected to one of said pair of filling valves, said filling valves being closed when an associated one of said high level liquid detectors detects the presence of a liquid.

6. The apparatus of claim 5 in which said filling pump ceases operating when said high level liquid level detectors both detect the presence of a liquid.

7. The cleaning system of claim 2 in which said first and second compartments have drain conduits leading to a remotely located drain and associated drain valves for opening and closing said drain conduits.

8. A cleaning system as recited in claim 1, wherein said semipermeable membrane is contained within a reverse osmosis unit, said first side of the membrane being a feed side of said reverse osmosis unit, and said second side of the membrane being a product side of said reverse osmosis unit.

9. A combination of a reverse osmosis unit including a feed side and a product side separated by a semipermeable membrane, and a cleaning system, said cleaning system comprising:

a container having a liquid barrier of predetermined height bifurcating said container into first and second compartments, said first and second compartments in liquid communication with each other above said predetermined height;

a conduit loop connecting said first compartment and said feed side of the reverse osmosis unit so that liquid can flow to said feed side and back to said first compartment;

a pump positioned in said conduit loop adapted to move said liquid residing in said first compartment in said loop; and a second liquid connector selectively placing said second compartment in liquid communication with the product side of said reverse osmosis unit;

wherein said first compartment initially contains a first liquid having a high osmotic value and membrane cleaning characteristics, and said second compartment initially contains a second liquid of low osmotic value; and wherein said second liquid migrates under osmotic pressure across said membrane into said first liquid, thereby increasing the volume of said first liquid in said first compartment until the predetermined volume of said first compartment is exceeded and said first liquid flows over said barrier into said second container, the migration of said second liquid continuing until the respective osmotic values of said first and second liquids equilibrate.

10. The combination of claim 9 including a pair of conduit lines connecting each of said compartments to a source of clean liquid product and a filling valve associated with each of said pair of conduit lines for opening and closing said conduit lines, each of said compartments being associated with a liquid level monitoring switch for detecting when the level of liquid reaches a predetermined level, each of said filling valves being responsive to an associated liquid level monitoring switch for closing said associated conduit line when said switch detects the presence of a liquid thereby preventing further entry of clean liquid product therein.

11. The combination of claim 10 further including a filling pump for moving clean liquid product through said pair of conduits into said first and second compartments, said filling pump in response to the concurrent detection of liquid in both of said compartments by said switches for becoming de-energized.

12. The combination of claim 9 including at least one monitor associated with at least one of said first and second compartments for measuring a selected physical characteristic of liquid contained in said one compartment.

13. The combination of claim 12 in which said monitor measures the pH level of the liquid in said one compartment.

14. The combination of claim 9 including a liquid detector associated with at least one of said compartments for detecting when liquid has reached a predetermined level in said one compartment.

15. The combination of claim 9 including a liquid detector associated with said first compartment for detecting the absence of liquid in said compartment.

* * * * *